(12) United States Patent
Shimazu

(10) Patent No.: US 12,254,450 B2
(45) Date of Patent: Mar. 18, 2025

(54) ELECTRONIC RECEIPT SYSTEM, ELECTRONIC RECEIPT MANAGEMENT METHOD, AND NON-TRANSITORY COMPUTER-READABLE MEDIUM

(71) Applicant: NEC Platforms, Ltd., Kawasaki (JP)

(72) Inventor: Norihiko Shimazu, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 294 days.

(21) Appl. No.: 17/778,542

(22) PCT Filed: Nov. 27, 2020

(86) PCT No.: PCT/JP2020/044191
§ 371 (c)(1),
(2) Date: May 20, 2022

(87) PCT Pub. No.: WO2021/111998
PCT Pub. Date: Jun. 10, 2021

(65) Prior Publication Data
US 2022/0414620 A1 Dec. 29, 2022

(30) Foreign Application Priority Data
Dec. 2, 2019 (JP) ................................. 2019-218073

(51) Int. Cl.
*G06Q 20/04* (2012.01)
*G06Q 20/20* (2012.01)
*G06Q 20/32* (2012.01)

(52) U.S. Cl.
CPC ......... *G06Q 20/047* (2020.05); *G06Q 20/209* (2013.01); *G06Q 20/3274* (2013.01)

(58) Field of Classification Search
CPC . G06Q 20/047; G06Q 20/209; G06Q 20/3274
See application file for complete search history.

(56) References Cited

U.S. PATENT DOCUMENTS

2015/0058186 A1* 2/2015 Argue ............... G06Q 40/12
705/30
2015/0356522 A1* 12/2015 Matsumoto .......... G06Q 20/322
705/30

(Continued)

FOREIGN PATENT DOCUMENTS

JP 2015-114832 A 6/2015
JP 2016-224652 A 12/2016

(Continued)

OTHER PUBLICATIONS

International Search Report for PCT Application No. PCT/JP2020/044191, mailed on Jan. 19, 2021.
JP Office Communication 2019-218073 dated Aug. 25, 2020.

*Primary Examiner* — A. Hunter Wilder
*Assistant Examiner* — Joseph M Mutschler
(74) *Attorney, Agent, or Firm* — Sughrue Mion, PLLC

(57) ABSTRACT

An electronic receipt system according to example embodiments includes: a code issuance server configured to issue a code in response to a request from a mobile terminal and to transmit the code to the mobile terminal; a POS terminal configured to read the code displayed on a screen of the mobile terminal, to transmit the code to the code issuance server for inquiry, and when it is confirmed that the code is one that is issued by the code issuance server, to associate the code and electronic receipt information generated when performing transaction processing with each other; and an electronic receipt management server configured to save the code and the electronic receipt information that are associated with each other received from the POS terminal and when the mobile terminal transmits the code, to transmit the electronic receipt information that is associated with the code to the mobile terminal.

10 Claims, 4 Drawing Sheets

(56) References Cited

U.S. PATENT DOCUMENTS

2015/0356549 A1* 12/2015 Patel ................... G06Q 20/209
                                                            705/21
2019/0122222 A1*  4/2019 Uechi ................... G06Q 20/42

FOREIGN PATENT DOCUMENTS

| JP | 2017-117319 A | 6/2017 |
| JP | 2019-083042 A | 5/2019 |

* cited by examiner

ELECTRONIC RECEIPT SYSTEM, ELECTRONIC RECEIPT MANAGEMENT METHOD, AND NON-TRANSITORY COMPUTER-READABLE MEDIUM

This application is a National Stage Entry of PCT/JP2020/044191 filed on Nov. 27, 2020, which claims priority from Japanese Patent Application 2019-218073 filed on Dec. 2, 2019, the contents of all of which are incorporated herein by reference, in their entirety.

TECHNICAL FIELD

The present disclosure relates to an electronic receipt system, an electronic receipt management method, and a non-transitory computer-readable medium.

BACKGROUND ART

In recent years, to simplify the checkout procedures and save resources (paperless) in restaurants and retail stores, electronic receipts, which enable mobile terminals such as smartphones to display electronic receipt information without having to take the steps of handing over and receiving paper receipts at checkouts, are being adopted and widely used. As for consumers, there are merits in using electronic receipts, such as being able to avoid the annoyance of paper receipts being accumulated and being able to manage expenditures based on the electronic receipt information.

Further, as for stores, there are merits in using electronic receipts, such as reduction in the cost for paper rolls used for printing out receipts, simplification of operations by reducing the labor of handing over and receiving the receipts, changing the paper rolls, and the like. On the other hand, possible demerits for consumers in using electronic receipts, i.e., factors that hinder widespread use of electronic receipts, include concerns of the consumers as to the information leakage of purchase data linked with their personal information to a third party.

Patent Literature 1 discloses an electronic receipt system that enables receipt of electronic receipt information by a mobile terminal without having to register personal information such as an ID number, an e-mail address, and the like. In this electronic receipt system, when wireless connection is established between a sales data processing apparatus and a mobile terminal, an electronic receipt information transmitting unit directly transmits, via a near-field wireless communication unit, electronic receipt information generated by an electronic receipt information generating unit of the sales processing apparatus based on the payment information related to payment for a product for which sales thereof is registered through sales data processing, to the mobile terminal.

CITATION LIST

Patent Literature

Patent Literature 1: Japanese Unexamined Patent Application Publication No. 2017-117319

SUMMARY OF INVENTION

While consumers can enjoy various merits by utilizing electronic receipts, they are concerned about the possible leakage of personal information regarding their tastes and preferences, such as the product purchase history and the order history at restaurants to a malicious third party due to attacks on the servers in which the electronic receipt information is accumulated, intrusion in the communication routes, and the like.

An object of the present disclosure is to provide, in view of the aforementioned problem, an electronic receipt system, an electronic receipt processing method, and a program each adapted to prevent leakage of personal information and to enable receipt information to be directly passed on to and received by a consumer.

An aspect of the present disclosure is an electronic receipt system including:

a code issuance server configured to issue a code in response to a request from a mobile terminal belonging to a consumer and to transmit the code to the mobile terminal;

a POS terminal configured to read the code displayed on a screen of the mobile terminal when executing transaction processing for an electronic receipt issuance target, to transmit the code to the code issuance server for inquiry, and when it is confirmed that the code is one that is issued by the code issuance server, to associate the code and electronic receipt information generated when performing transaction processing with each other; and an electronic receipt management server configured to receive the code and the electronic receipt information that are associated with each other from the POS terminal and save them, and when the mobile terminal transmits the code, to transmit the electronic receipt information that is associated with the code to the mobile terminal.

An aspect of the present disclosure is an electronic receipt management method including:

issuing a code in response to a request from a mobile terminal belonging to a consumer and transmitting the code to the mobile terminal;

reading the code displayed on a screen of the mobile terminal when executing transaction processing for an electronic receipt issuance target, transmitting the code to the code issuance server for inquiry, and when it is confirmed that the code is one that is issued by the code issuance server, associating the code and electronic receipt information generated when performing transaction processing with each other; and saving the code and the electronic receipt information that are associated with each other and when the mobile terminal transmits the code, transmitting the electronic receipt information that is associated with the code to the mobile terminal.

An aspect of the present disclosure is a program for causing a computer to execute the processes of:

issuing a code in response to a request from a mobile terminal belonging to a consumer and transmitting the code to the mobile terminal;

reading the code displayed on a screen of the mobile terminal when executing transaction processing for an electronic receipt issuance target, transmitting the code to the code issuance server for inquiry, and when it is confirmed that the code is one that is issued by the code issuance server, associating the code and electronic receipt information generated when performing transaction processing with each other; and saving the code and the electronic receipt information that are associated with each other, and when the mobile terminal transmits the code, transmitting the electronic receipt information that is associated with the code to the mobile terminal.

According to the present disclosure, it is possible to provide an electronic receipt system, an electronic receipt processing method, and a program each adapted to prevent leakage of personal information and to enable receipt information to be directly passed on to and received by a consumer.

DESCRIPTION OF EMBODIMENTS

Figure 1:
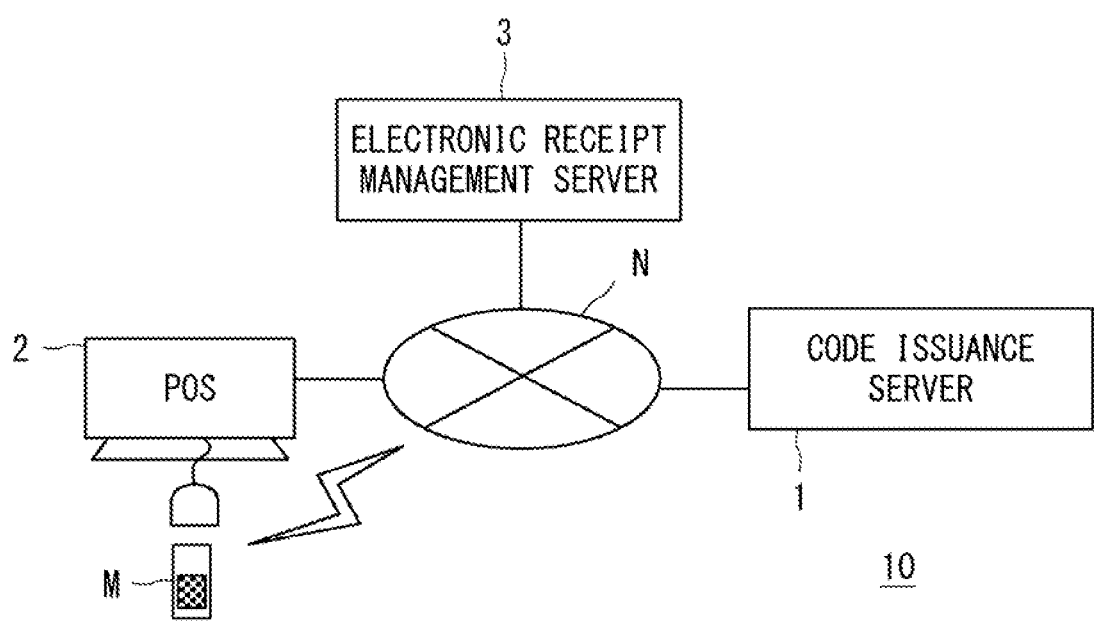
FIG. 1 is a diagram showing a schematic configuration of an electronic receipt system according to an example embodiment.

Hereinafter, the present disclosure will be described with reference to example embodiments. The following description and the attached drawings are appropriately shortened and simplified where appropriate to clarify the explanation. Further, each element shown in the drawings as a functional block that performs various processing can be configured of a CPU, a memory, and other circuits in terms of hardware.

An example embodiment relates to an electronic receipt system and an electronic receipt management method. FIG. 1 is a diagram showing a schematic configuration of an electronic receipt system according to an example embodiment. As shown in FIG. 1, an electronic receipt system 10 includes a code issuance server 1 capable of performing communication via a network N, a POS (Point of sale) terminal 2, and an electronic receipt management server 3.

The code issuance server 1 issues a code and transmits it to a mobile terminal M in response to a request from the mobile terminal M belonging to a consumer. The POS terminal 2 reads a code displayed on a screen of the mobile terminal M when executing transaction processing for an electronic receipt issuance target, transmits the code to the code issuance server 1 for inquiry, and when it is confirmed that the code is a code issued by the code issuance server 1, associates the code and the electronic receipt information that is generated when executing transaction processing with each other. The electronic receipt management server 3 receives the code and the electronic receipt information that are associated with each other from the POS terminal 2 and saves them, and when the mobile terminal M transmits the code, transmits the electronic receipt information associated with the code to the mobile terminal M. By this configuration, it is possible to prevent leakage of personal information and to enable receipt information to be directly passed on to and received by a consumer.

Figure 2:
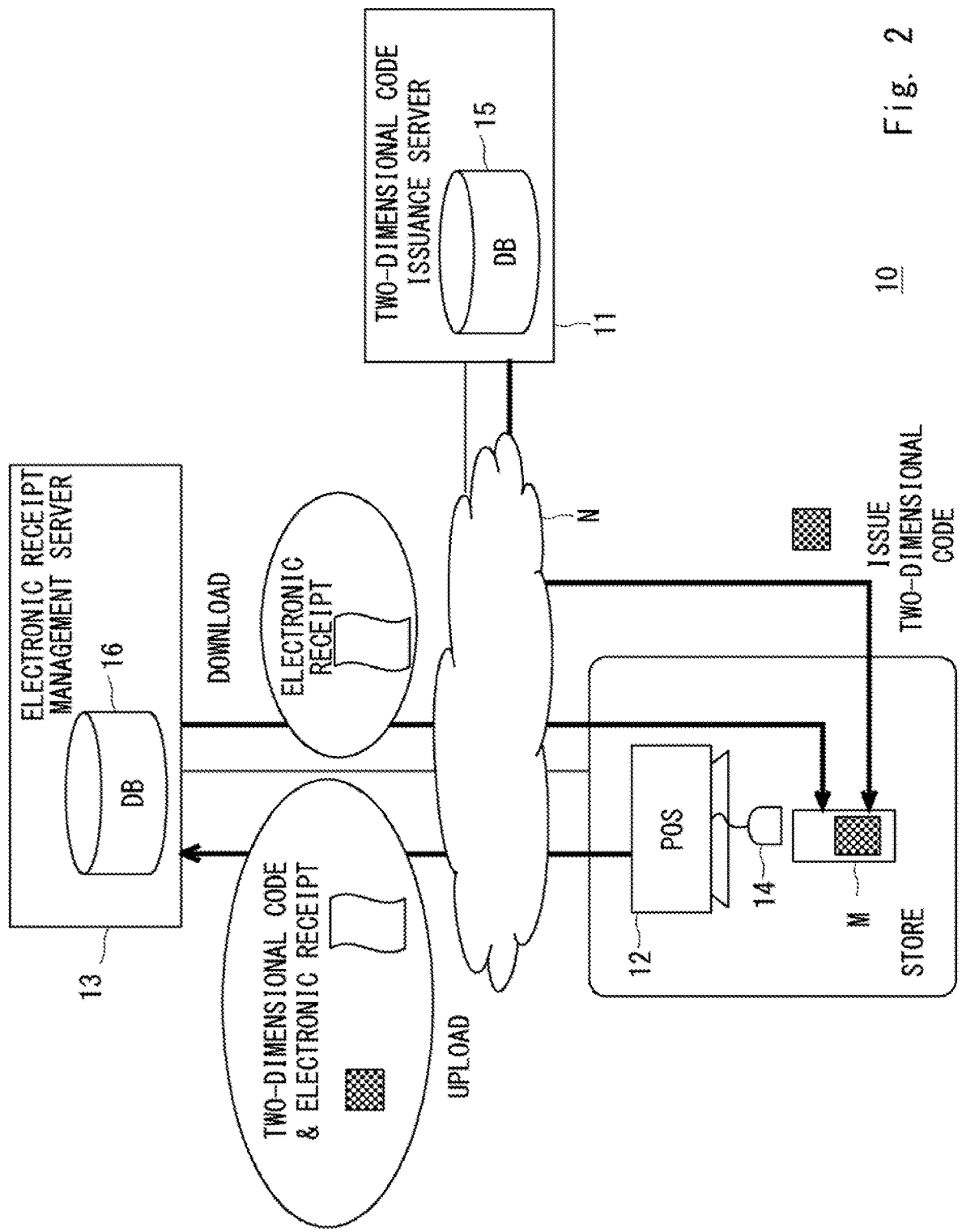
FIG. 2 is a diagram showing a configuration example of an electronic receipt system according to an example embodiment.

Hereinbelow, a specific configuration example of the present disclosure will be described. FIG. 2 is a diagram showing a configuration example of an electronic receipt system according to an example embodiment. As shown in FIG. 2, the electronic receipt system 10 includes a two-dimensional code issuance server 11, a POS terminal 12, an electronic receipt management server 13, a scanner 14, a code management DB 15, and an electronic receipt management DB 16. The two-dimensional code issuance server 11, the POS terminal 12, the electronic receipt management server 13, and the mobile terminal M are connected with one another by wired or wireless connection via the network N such as the internet. Note that in FIG. 2, data exchange is indicated by bold arrows.

The two-dimensional code issuance server 11 performs issuance and management of a two-dimensional code. Note that a barcode may be employed in place of the two-dimensional code. The two-dimensional code issuance server 11 accepts a request for issuance of a two-dimensional code via a dedicated application for two-dimensional code management installed on the mobile terminal M such as a consumer's smartphone. The issued two-dimensional code is transmitted to the mobile terminal M. The code management DB 15 saves the two-dimensional code and a validity term of the two-dimensional code. Note that when the two-dimensional code is not used within the validity term, the two-dimensional code is deleted from the code management DB 15.

The POS terminal 12 is installed at a store and used to perform transaction processing with a consumer. Once the consumer performs payment processing, for example, in cash or by card, and the series of transaction processing ends, the POS terminal 12 generates electronic receipt information including the transaction details of the target product for payment.

The POS terminal 12 is equipped with the scanner 14 for reading the two-dimensional code. In the case where a two-dimensional code is shown by a consumer when performing transaction processing for an electronic receipt issuance target, the two-dimensional code displayed on the screen of the mobile terminal M is read at the store's end using the scanner 14. The two-dimensional code read by the scanner 14 is transmitted to the two-dimensional code issuance server 11 for inquiry as to whether or not it is the code issued by the two-dimensional code issuance server 11.

When it is confirmed that the two-dimensional code is the code issued by the two-dimensional code issuance server 11, the POS terminal 12 transmits the two-dimensional code and the electronic receipt information generated at the time of executing the transaction processing that are associated with each other to the electronic receipt management server 13 via the network N (uploads a set of the two-dimensional code and the electronic receipt information).

In this case, the store does not issue a paper receipt and instead, uploads electronic receipt information that is not linked with the personal information of a consumer who has purchased a product or the like to the electronic receipt management server 13 along with the two-dimensional code. Note that when a two-dimensional code is not shown by a consumer, the transaction details may be printed on a paper and a paper receipt may be issued.

The electronic receipt management server 13 stores the two-dimensional code and the electronic receipt information in the electronic receipt management DB 16 and manages them. Note that the method of transmitting the electronic receipt information is not particularly limited and a general protocol such as HTTP or HTTPS may be used. Further, the number of the POS terminal 12 to be installed at a store may be one or more.

The electronic receipt management server 13 saves the two-dimensional code and the electronic receipt information that are associated with each other and received from POS terminal 12. When the two-dimensional code is transmitted from the mobile terminal M to the electronic receipt management server 13, the electronic receipt management server 13 transmits the electronic receipt information associated with the two-dimensional code to the mobile terminal M. The electronic receipt information is displayed as an electronic receipt on the mobile terminal M from which a request for an electronic code is made. As described above, in this example embodiment, consumers can acquire electronic receipt information directly from the electronic receipt management server 13 whereby they can use electronic receipt without having any concerns as to the leakage of personal information.

Note that the two-dimensional code is not linked with any specific store or any chain stores. Therefore, the electronic receipt system can be utilized in such a way that when a consumer visits a family restaurant (Store A), a coffee shop (Store B), and then a convenience store (Store) in succession, electronic receipt information is issued using the same two-dimensional code at all of the stores the consumer has visited, and the consumer collectively downloads the electronic receipts.

Figure 3:
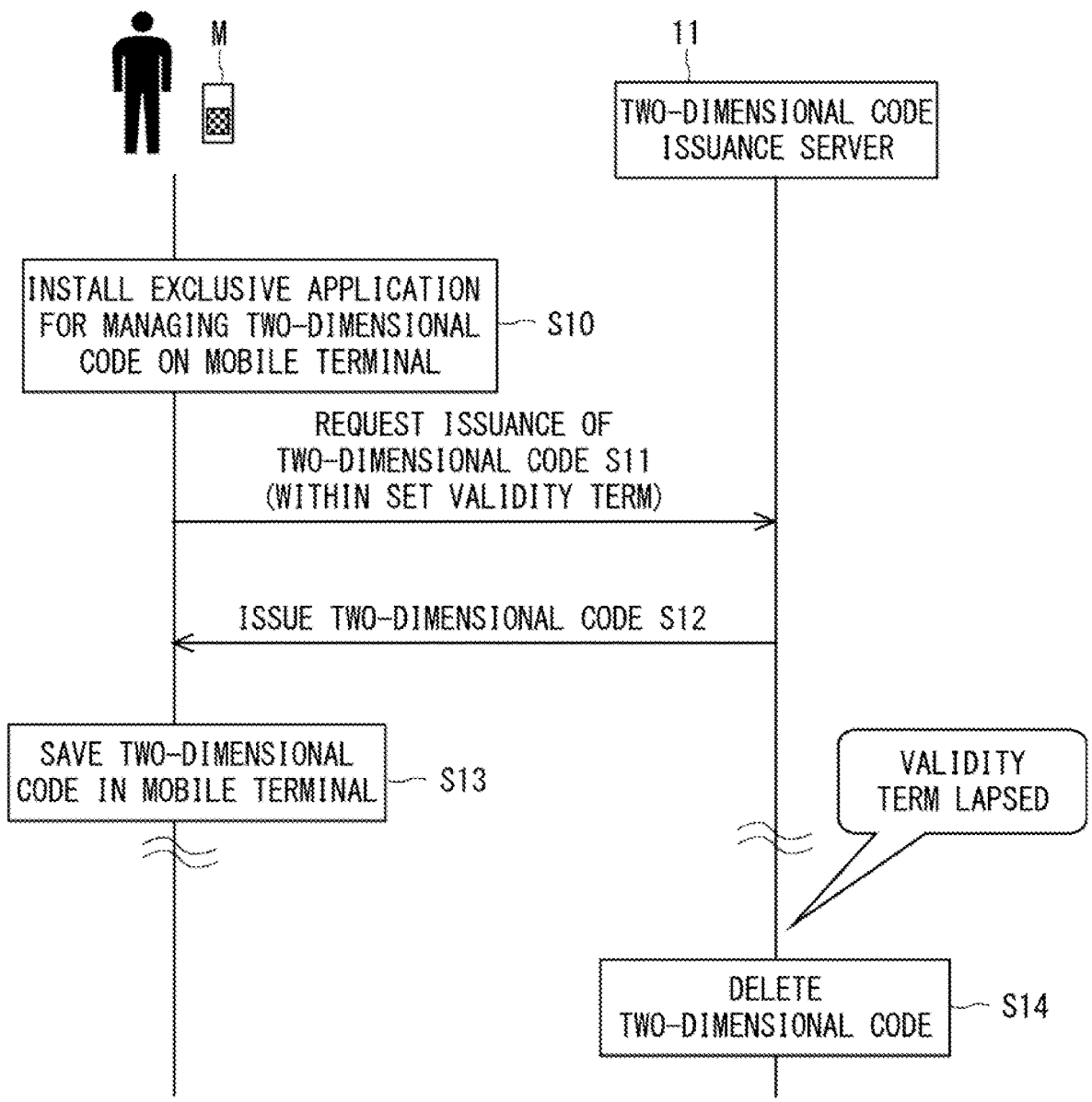
FIG. 3 is a diagram for describing a flow of issuance of a two-dimensional code in an electronic receipt management method according to an example embodiment.

Here, a flow of issuance of a two-dimensional code in an electronic receipt management method according to an example embodiment will be described with reference to FIG. 3. As shown in FIG. 3, a consumer who wants to use the service of the electronic receipt installs, in advance, a dedicated application for two-dimensional code management on the mobile terminal M he/she is holding (S10) and acquires a two-dimensional code via the application. By using the dedicated application, accessibility to an authorized server which is not an unauthorized server can be ensured. Further, it is possible to correct practices that may lead to abuse such as acquisition of a large number of two-dimensional codes using an automatic program of a PC and the like.

Then, using the application, the consumer makes a two-dimensional code issuance request to the two-dimensional code issuance server 11 (S11). In making the two-dimensional code issuance request, there is no need to enter personal information such as the name, the address, the phone number, and the email address, and only setting of the validity term of the two-dimensional code is performed. The validity term specifies the grace period from the end of the transaction processing for an electronic receipt issuance target at the store to downloading of the electronic receipt, and a period of, for example, several hours up to about a month can be specified. The validity term can be set at the discretion of the consumer who is holding the mobile terminal M.

The two-dimensional code issuance server 11 issues a two-dimensional code in response to the two-dimensional code issuance request from the mobile terminal M (S12). The consumer saves the issued two-dimensional code on the mobile terminal M (S13). Note that when the validity term of a two-dimensional code lapses without using the two-dimensional code, the unused two-dimensional code is deleted from the two-dimensional code issuance server 11 (S14). Further, a two-dimensional code for which the validity term has lapsed is deleted from the mobile terminal M. The consumer can set a new validity term every time he/she performs a two-dimensional code issuance request and notify the two-dimensional code issuance server 11 of the newly set validity term and request issuance of a two-dimensional code.

Figure 4:
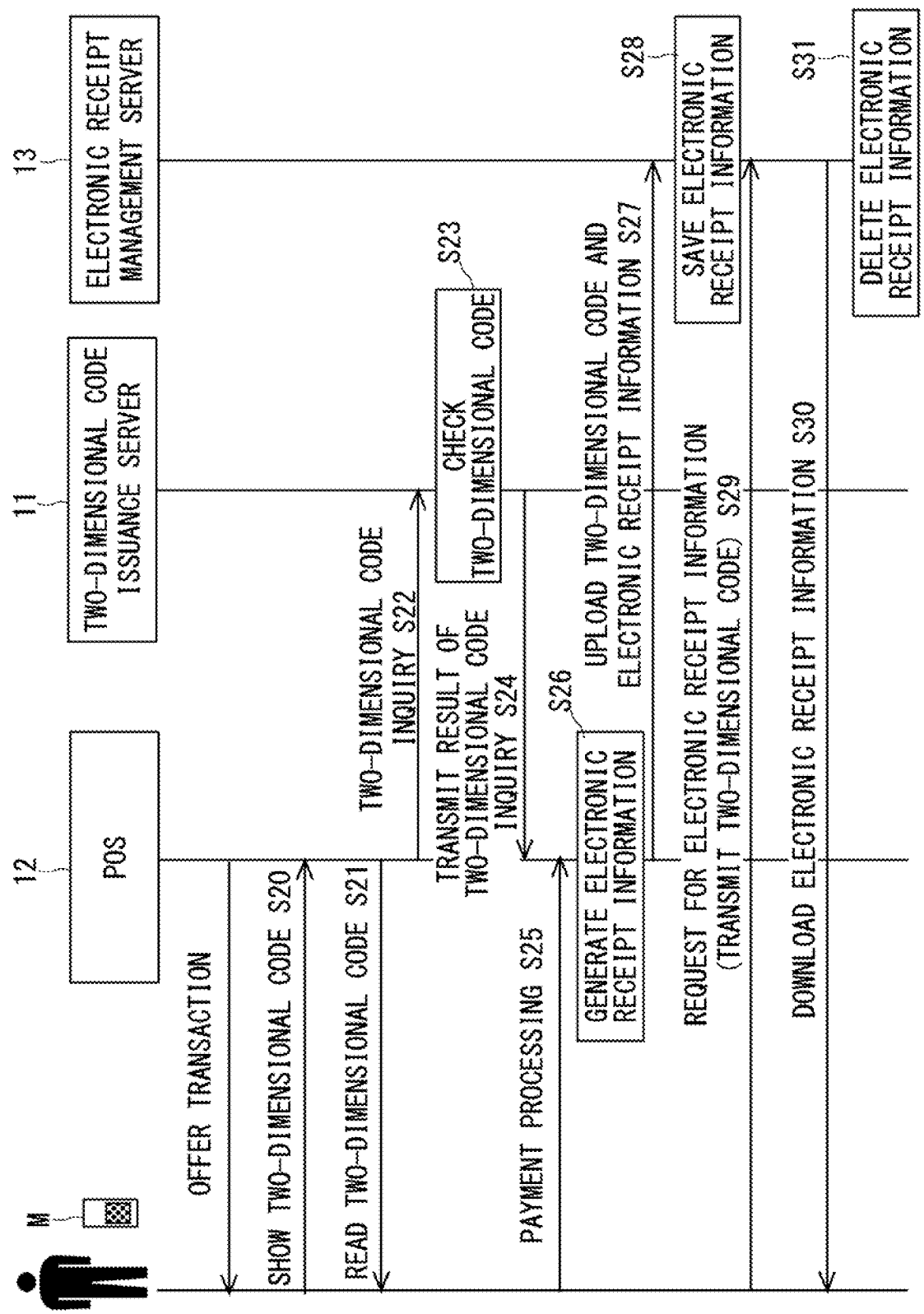
FIG. 4 is a diagram for describing a flow of issuing and receiving an electronic receipt in an electronic receipt management method according to an example embodiment.

Next, a flow of issuing and receiving an electronic receipt in an electronic receipt management method according to an example embodiment will be described with reference to FIG. 4. As shown in FIG. 4, a store at which the POS terminal 12 is installed is a store where products are sold, a store where foods and beverages are offered, a store that provide services, and the like. A consumer who wants to use an electronic receipt shows the two-dimensional code acquired in advance by displaying it on the mobile terminal M when performing transaction processing for an electronic receipt issuance target at a store capable of providing electronic receipts (S20).

Then, the two-dimensional code M shown by the consumer is read at the store's end using the scanner 14 provided to the POS terminal 12 (S21). The read two-dimensional code is transmitted to the two-dimensional code issuance server 11 for inquiry as to whether or not it is the code issued by the two-dimensional code issuance server 11 (S22). The two-dimensional code issuance server 11 checks that the two-dimensional code is not an invalid code, that the two-dimensional code is the one within the validity term, and that the two-dimensional code matches with the code saved in the code management DB 15 (S23), and when these items to be checked are met, transmits the result of the inquiry to the POS terminal 12 (S24).

When the consumer performs payment processing (S25), the POS terminal 12 generates electronic receipt information (S26). When the POS terminal 12 confirms, based on the result of inquiry in S24, that the two-dimensional code is the code issued by the two-dimensional code issuance server 11, it uploads (UL) the two-dimensional code and the electronic receipt information that are associated with each other to the electronic receipt management server 13 (S27).

The electronic receipt management server 13 saves the electronic receipt information received from the POS terminal 12 in association with the two-dimensional code (S28). Then, by transmitting the two-dimensional code used at the time of transaction from the mobile terminal M to the electronic receipt management server 13 via the dedicated application, the electronic receipt information is requested (S29). In response to this request, the electronic receipt information associated with the two-dimensional code is downloaded from the electronic receipt management server 13 to the mobile terminal M (S30). When the electronic receipt information is downloaded, the electronic receipt information is deleted from the electronic receipt management server 13 (S31).

As described above, according to the example embodiments, as for stores, the cost for paper rolls can be reduced by eliminating issuance of paper receipts. Further, it is possible to simplify the work by reducing the labor such as handing over and receiving the receipts, changing the paper rolls, and the like.

Further, as for consumers, they can be freed from the annoyance of paper receipts being accumulated in their wallets. By downloading the electronic receipt, the expenditure information can be digitized immediately, whereby management of expenditures can be facilitated by linking the electronic receipt with the expenditure management application or the like.

There is no need to enter any personal information from the issuance of the two-dimensional code to the downloading of the electronic receipt, and the electronic receipt and the personal information are not linked with each other. Therefore, it is possible to use the service of electronic receipt without involving any concerns as to the leakage of personal information due to information leakage. Further, elimination of concerns as to the leakage of personal information leads to promotion of the electronic receipt service, which leads to resource saving owing to going paperless in the society as a whole, which will lead to environmental preservation.

Further, since the two-dimensional code is not liked with any specific store or any chain and does not acquire/retain any personal information, infrastructure such as the two-dimensional code issuance server and the electronic receipt management server can be shared with any store, chain, and industry including databases thereof. Since there is no need to configure a system for each store and each chain store, it is possible to reduce the initial investment in system implementation.

Note that the present disclosure is not limited to the aforementioned example embodiments and can be modified as appropriate without departing from the spirit and the scope of the present disclosure. In the aforementioned example, the server does not retain personal information such as the telephone number and the email address and so it is not possible to provide push notifications via e-mail or SMS after issuance of the electronic receipt. Therefore, a case is assumed in which even when electronic receipt information is generated, the validity term lapses without the electronic receipt information being downloaded.

Therefore, the dedicated application for the mobile terminal M may further include a function of making a notification when the electronic receipt information has not been transmitted from the electronic receipt management server 13 to the mobile terminal M triggered by the display of the two-dimensional code on the screen of the mobile terminal M.

For example, triggered by the display of the two-dimensional code by the dedicated application at the time of performing transaction for the electronic receipt issuance target, the mobile terminal M accesses the dedicated URL (Uniform Resource Locator) for downloading the electronic receipt after elapse of a predetermined time and makes a notification as to the presence or the absence of the electronic receipt information and sends a reminder to transmit the electronic receipt. Accordingly, it is possible to encourage the consumer to download the electronic receipt.

Further, triggered by the display of the two-dimensional code by the dedicated application at the time of performing transaction for the electronic receipt issuance target, the mobile terminal M may have the dedicated application access the aforementioned URL on a periodic basis and check for presence or absence of the electronic receipt information and when the electronic receipt information is present, either makes a notification as to the presence of the electronic receipt information or automatically downloads the electronic receipt information.

As described above, according to the example embodiments, a consumer who wants to use an electronic receipt retains the two-dimensional code for which validity term is set in advance and shows the code when performing transaction at each store. When performing transaction processing, the code is read using the POS terminal 12 whereby paper receipt is not issued at the store's end, and instead, a set of the code and the electronic receipt information is uploaded from the POS terminal 12 to the electronic receipt management server 13. Then, the consumer can download the electronic receipt information by transmitting the two-dimensional code to the electronic receipt management server 13 within the validity term. As described above, only the electronic receipt information that is not liked with the personal information is accumulated in the electronic receipt management server 13, and even if information leakage occurs, it will not lead to leakage of any personal information.

The electronic receipt system according to the example embodiments is intended for use at restaurants such as family restaurants and cafes that operate in chains of a medium scale (dozens of stores) or a large scale (several hundreds of stores), retail stores such as convenience stores and supermarkets, and stores that have an environment in which the POS terminal can establish connection with the network (or that can provide the same environment).

Note that while in the above-described example embodiments, the present disclosure has been described as a hardware configuration, the present disclosure it not limited thereto. In the present disclosure, arbitrary processing can be implemented by causing a CPU (Central Processing Unit) to execute a computer program.

Further, the aforementioned program can be stored and provided to a computer using any type of non-transitory computer readable media. Non-transitory computer readable media include any type of tangible storage media. Examples of non-transitory computer readable media include magnetic storage media (e.g. floppy disks, magnetic tapes, hard disk drives, etc.), optical magnetic storage media (e.g. magneto-optical disks), CD-ROM (Read Only Memory), CD-R, CD-R/W, and semiconductor memories (e.g. mask ROM, PROM (programmable ROM), EPROM (Erasable PROM), flash ROM, RAM (random access memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

The present disclosure has been described with reference to the example embodiments. However, it should be noted that the present disclosure is not to be limited in any way by the example embodiments described above. Various modifications can be made to the configuration and details of the present disclosure without departing from the spirit and scope of the present disclosure.

This application is based upon and claims the benefit of priority from Japanese patent application No. 2019-218073, filed on Dec. 2, 2019, the disclosure of which is incorporated herein in its entirety by reference.

REFERENCE SIGNS LIST

1 CODE ISSUANCE SERVER
2 POS TERMINAL
3 ELECTRONIC RECEIPT MANAGEMENT SERVER
10 ELECTRONIC RECEIPT SYSTEM
11 TWO-DIMENSIONAL CODE ISSUANCE SERVER
12 POS TERMINAL
13 ELECTRONIC RECEIPT MANAGEMENT SERVER
14 SCANNER
15 CODE MANAGEMENT DB
16 ELECTRONIC RECEIPT MANAGEMENT DB
M MOBILE TERMINAL
N NETWORK

The invention claimed is:
1. An electronic receipt system comprising:
a code issuance server configured to generate and issue a code that is not linked to a personal information of a customer in response to a request from a mobile terminal belonging to a to the consumer and to transmit the code to the mobile terminal;
a POS terminal configured to read the code displayed on a screen of the mobile terminal when executing transaction processing for an electronic receipt issuance target, transmit the code to the code issuance server for inquiry, and when it is confirmed that the code is one that is issued by the code issuance server, associate the code and electronic receipt information generated when performing transaction processing with each other; and an electronic receipt management server configured to receive the code and the electronic receipt information that are associated with each other from the POS terminal and save them, and when the mobile terminal transmits the code, to automatically transmit the electronic receipt information that is associated with the code to the mobile terminal.

2. The electronic receipt system according to claim 1, wherein, when an inquiry for the code issued by the code issuance server is not made, the code issuance server deletes the code after elapse of a predetermined time.

3. The electronic receipt system according to claim 2, wherein the predetermined time can be set arbitrarily with the mobile terminal.

4. The electronic receipt system according to claim 1, wherein the electronic receipt management server deletes the code and the electronic receipt information saved therein after transmitting the electronic receipt information associated with the code received from the mobile terminal.

5. The electronic receipt system according to claim 1, wherein when the electronic receipt information has not been transmitted from the electronic receipt management server to the mobile terminal triggered by the display of the code on the screen of the mobile terminal, the mobile terminal makes a notification.

6. The electronic receipt system according to claim 5, wherein the mobile terminal accesses a URL for downloading electronic receipts and makes a notification as to the presence or the absence of the electronic receipt information.

7. The electronic receipt system according to claim 6, wherein the mobile terminal accesses the URL for downloading electronic receipts on a periodic basis and when the electronic receipt information is present, either makes a notification as to the presence of the electronic receipt information or automatically downloads the electronic receipt information.

8. The electronic receipt system according to claim 1, wherein the mobile terminal is configured to periodically check for presence the electronic receipt information after displaying the code, and automatically download the electronic receipt information based on presence of the electronic receipt information being detected.

9. An electronic receipt management method comprising:
generating and issuing a code that is not linked to a personal information of a customer in response to a request from a mobile terminal belonging to the consumer and transmitting the code to the mobile terminal;
reading the code displayed on a screen of the mobile terminal when executing transaction processing for an electronic receipt issuance target, transmitting the code to the code issuance server for inquiry, and when it is confirmed that the code is one that is issued by the code issuance server, associating the code and electronic receipt information generated when performing transaction processing with each other; and
saving the code and the electronic receipt information that are associated with each other, and when the mobile terminal transmits the code, automatically transmitting the electronic receipt information that is associated with the code to the mobile terminal.

10. A non-transitory computer readable medium storing a program for causing a computer to execute the processes of:
generating and issuing a code that is not linked to a personal information of a customer in response to a request from a mobile terminal belonging to the consumer and transmitting the code to the mobile terminal;
reading the code displayed on a screen of the mobile terminal when executing transaction processing for an electronic receipt issuance target, transmitting the code to the code issuance server for inquiry, and when it is confirmed that the code is one that is issued by the code issuance server, associating the code and electronic receipt information generated when performing transaction processing with each other; and
saving the code and the electronic receipt information that are associated with each other, and when the mobile terminal transmits the code, automatically transmitting the electronic receipt information that is associated with the code to the mobile terminal.

* * * * *